Feb. 10, 1942.  L. J. MADDEN  2,272,177
MACHINE FOR APPLYING COATINGS TO FISHING LINES
Filed March 24, 1939   3 Sheets-Sheet 1
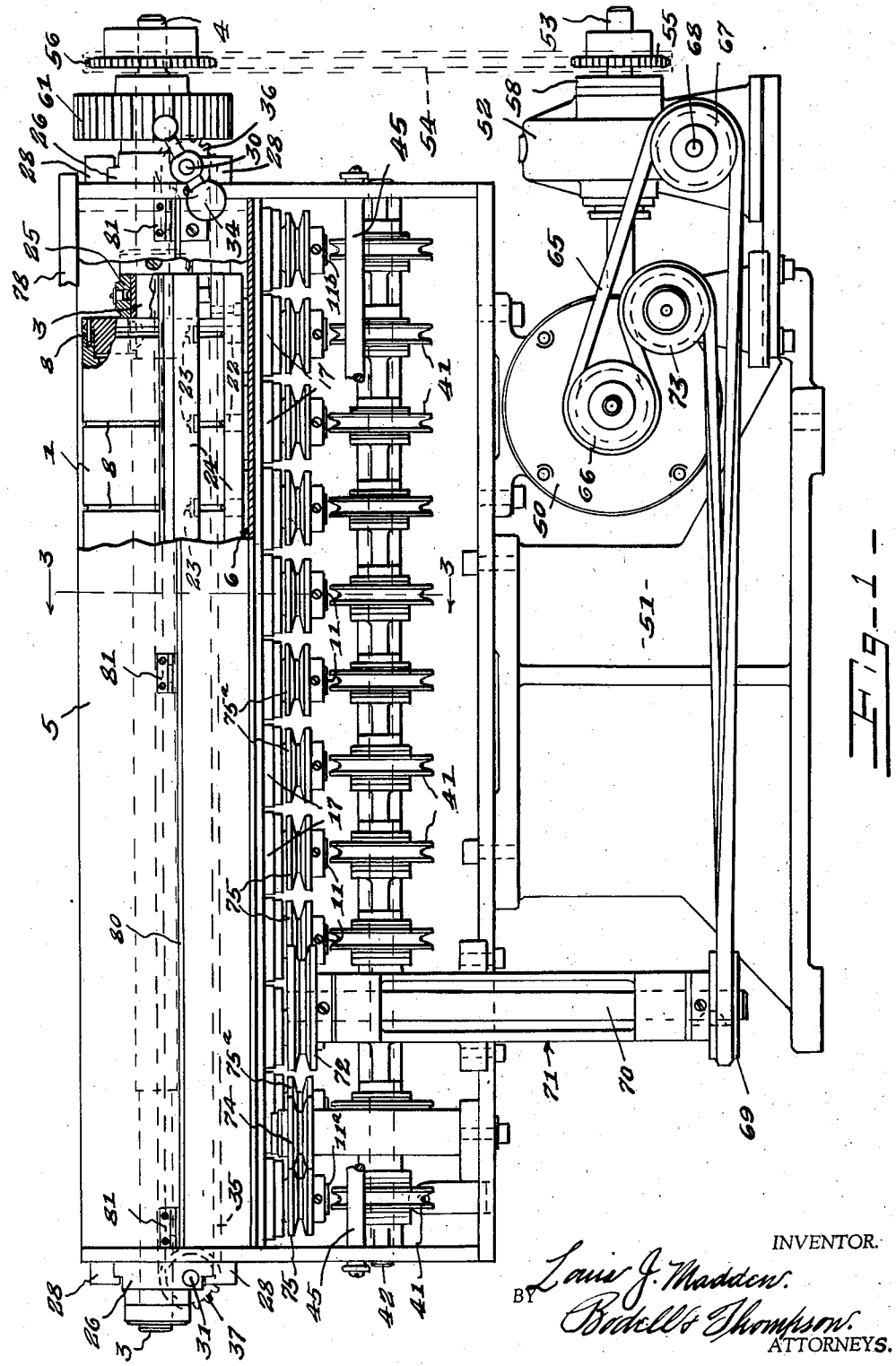
INVENTOR.
Louis J. Madden.
BY Bodell & Thompson.
ATTORNEYS.

Feb. 10, 1942.  L. J. MADDEN  2,272,177
MACHINE FOR APPLYING COATINGS TO FISHING LINES
Filed March 24, 1939  3 Sheets-Sheet 2
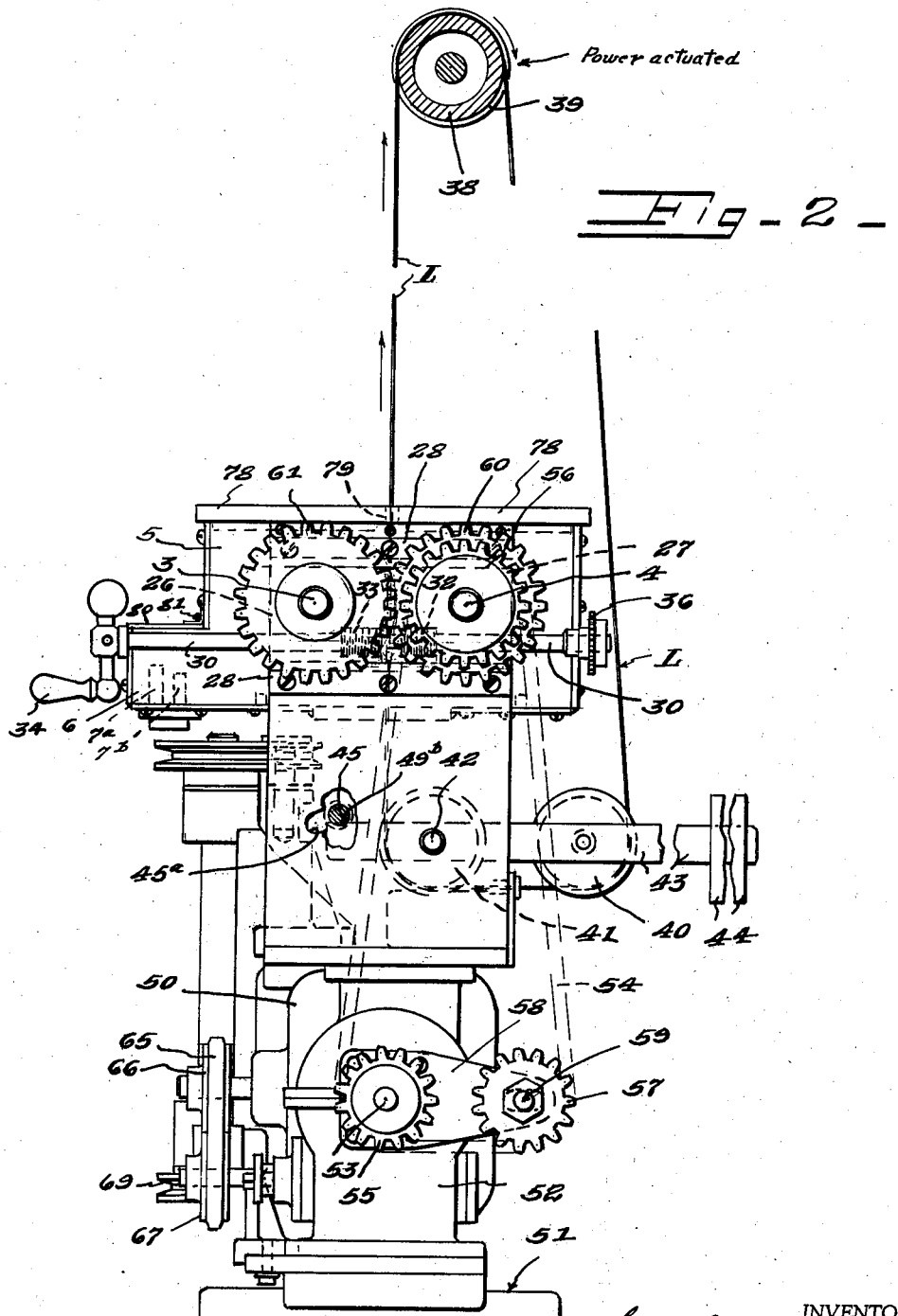

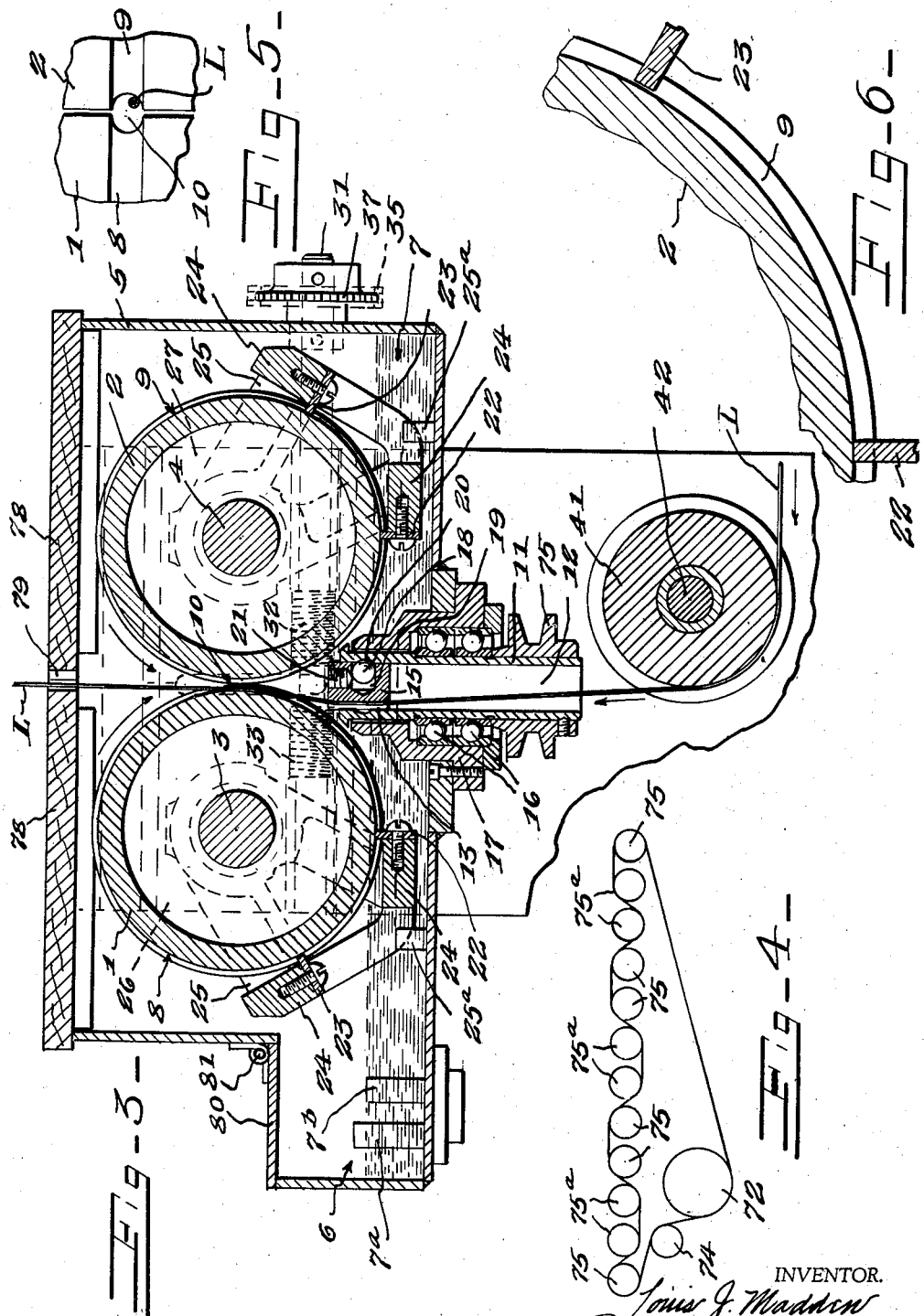

Patented Feb. 10, 1942

2,272,177

UNITED STATES PATENT OFFICE 2,272,177

MACHINE FOR APPLYING COATINGS TO FISHING LINES

Louis J. Madden, Syracuse, N. Y., assignor to Newton Line Company, Inc., Homer, N. Y., a corporation of New York Application March 24, 1939, Serial No. 263,955

13 Claims. (Cl. 91—51)

This invention relates to a machine for applying coatings to lines or cords, as for applying coatings to or lacquering fishing lines, and has for its object a machine in which successive coatings are applied outside of the sump or container for the coating liquid or lacquer, that is, the line is not dipped in the liquid. By the term "line" is meant cord, twine, threads, etc., and also wire or wires having a fabric or other covering.

It also has for its object a machine for evenly and smoothly and quickly applying the coatings, regardless of the diameter of the line or varying diameters of the line, such as when a tapered line is being coated.

More specifically, it has for its object a machine in which the line is drawn through a passage located outside of a sump, to which passage the liquid is being constantly and uniformly fed, and in which passage the coating is applied, as the line is moved orbitally or relative orbital movement of the passage and line effected, while the line is being drawn through said passage.

In describing this invention, reference is had to the accompanying drawings in which like characters designate corresponding parts in all the views.

Figure 1 is a side elevation, partly broken away, of a machine embodying this invention.

Figure 2 is an end elevation thereof showing the line strung through the machine and over an overhead feeding roll.

Figure 3 is an enlarged sectional view on line 3—3, Figure 1.

Figure 4 is a diagrammatic view of the motion transmitting means for the rotating heads which give the orbital movement to the line.

Figure 5 is a fragmentary plan view of the portion of the roll forming the passage through which the line is drawn, the line being shown therein.

Figure 6 is an enlarged fragmentary view illustrating the means or scraper by which a predetermined amount of liquid coating is supplied to the passage where the coating is applied to the line.

In the machine here illustrated the line is moved orbitally while being drawn through the passage to which the lacquer or other coating is supplied. This machine comprises, generally, means for providing a passage through which the line is lineally passed or drawn and for supplying the liquid coating to the walls of said passage, means for moving the line orbitally while being drawn through said passage, thereby causing the line, during its orbital and lineal movements, to wipe off and take up the liquid on the walls of the passage. It also comprises means for smoothing the coating that is set or partly set on the line, after each coating is applied, or before an additional or successive coating is applied. The orbital movement causes all portions of the periphery of the line to wipe evenly on the walls of the passage, or causes the line to, in effect, make a complete rotation, while making one orbital revolution, although in so doing, the line is not twisted.

The means for providing the passage to which the line is lineally passed, in this embodiment of my invention, comprises a pair of rotary members, here shown as rolls, arranged with their peripheries running substantially tangent to each other and shaped to form a tubular passage between them, where they run tangent. As here illustrated, each roll is formed with peripheral grooves, one groove of each roll mating with the groove of the other roll, where they are tangent, forming the passage through which the line is drawn, and the means for supplying the liquid coating to the walls of the passage is a sump into which the rolls dip during the rotating movement, so that the liquid is picked up by the rolls or the grooves thereof. The rolls are arranged in horizontal position in the sump and rotate in opposite directions and preferably with their tangent sides moving downwardly toward the sump.

The machine is also provided with means by which a predetermined amount of coating is applied to each groove.

1 and 2 designate respectively the rotating members as rolls, each being mounted on an axle 3, 4 journalled in suitable bearings, which are supported in the end walls of a receptacle 5, the lower portion 6 of which forms a sump for the liquid coating or lacquer 7 into which the lower portions of the rolls dip. Each roll 1, 2 is formed with a peripheral circumferential groove 8, 9, there being a series of peripheral grooves 8 or 9 on each roll. The grooves 8, 9 of the rolls mate, where the rolls run tangent to each other providing a series of upright passages 10 through which successive runs of the line are drawn upwardly. The line is moved orbitally in the passages 10 by rotating heads 11 extending through the bottom of the receptacle 5 or the lower side thereof and terminating above the level of the liquid 7 therein. There is a head 11 for each passage 10, and the head is arranged in alinement with the passage 10. Each head is formed with a lengthwise passage 12 having an eccentric portion 13 at its upper end, that is, its end nearest the adjacent passage 10 and the line L extends through the passage 12, eccentric portion 13 and through the passage 10.

During the rotation of the head 11, the line moves into the eccentric portion 13 of the head, giving an orbital movement which causes it to move orbitally against the walls of the passage 10 and take up the liquid coating thereon. Also, in the draw of the line over the walls of the eccentric portion 13 of the passage of the head, during the rotation of the head or during the orbital movement, the coating previously applied is rubbed or smoothed, so that the successive coatings are evenly applied throughout the length of the line regardless of any change in diameter or the taper of the line.

The head 11 is shown as tubular having a plug 15 in its upper end in which the eccentric portion 13 is formed, the head being mounted in suitable anti-friction bearings 16 mounted in a cage 17 extending through the bottom of the receptacle 5 to above the level of the liquid coating 7 therein. The plug 15 is held in position in the head 11 by a locking member, as a ball 18, located in a radial bore 19 in the plug 15 and extending into a notch, way or groove 20 in the upper end of the tubular head 11, the ball being wedged into the groove by a set screw extending into the top of the plug 15 and wedging at its lower end against the edge of the ball to force the ball outwardly.

The first and last heads, designated 11a and 11b, of the series of heads 11 are not alined with a passage 10. The first run of the line from the skein or reel passes through the head 11a up over the roll 38 to be described, and the last run passes through the head 11b to a delivery point where it is wound or prepared for packaging.

The means for supplying a predetermined amount of coating to each passage 10 consists of a pair of scrapers for each groove 8 or 9 of each roll. One scraper 22 is located below the level of the liquid 7 in the sump 6 and scrapes the groove 8 or 9 as clean as possible, and the other scraper 23 extends part way into the groove, in order to scrape out all the liquid from the groove, except the predetermined amount (see Figure 5). The scraper 23 is located between the scraper 22 and the passage 10 with respect to the direction of rotation of the rolls 1, 2. These scrapers are here shown as carried by a suitable support 24 extending lengthwise of each roll and having brackets 25 at their ends mounted respectively on the shafts 3, 4 for the rolls 1, 2. 25a are stops for limiting the swinging movement of the scrapers about the shafts 3, 4 effected by friction between the scrapers 22 and the walls of the grooves 8 or 9.

7a and 7b are gages in the sump 6 to indicate the high and low levels of the liquid, as lacquer, in the sump.

The rolls are separable from each other for the purpose of threading the runs of the line through the passages 10, and as here illustrated, the shafts 3, 4 are mounted in bearings in blocks 26, 27 respectively, which are slidable laterally in suitable guides 28, and they are movable along these guides by suitable operating means, here shown as shafts 30 and 31 extending transversely through each set of bearings 26, 27 and held from endwise movement and having right and left screw threaded portions 32, 33 (Figure 3) threading in similarly threaded passages in the blocks 26, 27 respectively. Thus, turning of the shafts 30 and 31 in one direction causes the blocks to separate and in the opposite direction to come together, causing the rolls to separate out of their position in Figure 2, when turned in one direction, and to come together in operative position, when the shafts 30, 31 are turned in the opposite direction. The shaft 30 is turned by means of a suitable crank or handle 34 and the motion of the shaft 30 is transmitted to the shaft 31 through motion transmitting means, as a sprocket chain 35, running over wheels 36 and 37 on the shafts 30 and 31 respectively.

The line L, after passing through the first head 11a, passes up over a power actuated roller 38 having a series of peripheral grooves 39 therein, one groove 39 for each passage 10, and after passing over this roll 38, passes downwardly over suitable guides and upwardly through the next rotating head 11 of the series. The roller 38 is actuated by any suitable power means, and it is located a considerable distance above the rolls 1, 2. During the passage of the runs of line from the passages 10 over to the roll 38 and back again, the liquid coating has a chance to become set or partly set. This coating, when set, is not brittle, but is flexible.

The power actuated roll constitutes the means for drawing the line through the passages 10.

The return runs of the line from the roll 38 is guided to the lower ends of the rotating heads 11 by pulleys 40 and 41, there being one set of pulleys 40, 41 for each rotating head 11. Each pulley 41 is mounted on a shaft 42 suitably supported in the frame of the machine with its periphery tangent to the axial line of one of the heads 11. Each pulley 40 is carried by a lever 43 pivoted or fulcrumed on the shaft 42 and the lever 43 may be provided with a suitable weight 44 for applying tension to the return run of the line from the roll 38. The pivotal movement, under the influence of the weight 44, is limited by a stop 45. There is a lever 43, a pair of pulleys 40, 41 for each rotating head 11. The stop 45 is a rod mounted in slots 45a which permit it to be shifted to release the ends of the levers 43. The rod is mounted in slots 45a formed in the frame of the machine and normally seats in notches 49b in the ends of the levers 43. To disengage the levers 43 from the rod, the outer ends of the levers 43 are lifted to disengage their inner ends from the rod, whereupon the rod may be displaced along the slots 45a.

The rolls 1, 2 are rotated, and also the heads 11, are rotated in any suitable manner. Likewise, the roll 38 is actuated in any suitable manner.

50 designates an electric motor suitably mounted on the base 51 of the frame of the machine. 52 is a reduction gear box also mounted on the base 51 and actuated by the motor, to be presently described. The output shaft 53 of the reduction gearing within the box 52 is connected to the rolls 1, 2 through suitable motion transmitting mechanism comprising a chain or belt 54 running over a wheel 55 on the shaft 53 over a wheel 56 on the shaft of one of the rolls 1, 2, as the shaft 3 of the roll 1. This chain 54 also runs around an idler wheel 57 carried by an arm 58, this wheel 57 being capable of radial adjustment toward and from the wheel 55 to properly tighten the chain 54, by reason of a pin-and-slot connection at 59. The motion of the shaft 3 is transferred to the shaft 4 of the roll 2 through suitable intermeshing gears 60 and 61 on the shafts 3 and 4 respectively.

Some of the heads 11 are rotated in one direction, and others in the opposite direction, those rotating in one direction being arranged in alternation with those rotating in the other direction. The head 11 are actuated from the motor in any suitable manner, here shown as by a belt 65 running over a pulley 66 on the motor, over a pulley 67 on the input shaft 68 of the reduction gearing 52, thence over a pulley 69 on the lower end of the vertical shaft 70 suitably mounted in a supporting bracket 71 on the frame, and thence back over an idler pulley 73 through the pulley 66. The shaft 70 has a pulley 72 at its upper end, and a belt passes around the pulley 72 over an idler 74, thence over a pulley 75 on the first of the series of rotating heads 11, then alternately around one side of the next pair of pulleys 75ª on the next pair of heads 11. Then the belt is reversed to run around the opposite side of the next pair of pulleys 75 of the next two heads 11, and so on, throughout the series. This is for the purpose of reversing the direction of the orbital movement of the different runs of line, so that the twist in the spun or braided line will not be modified.

The reservoir 5 is provided with a suitable cover 78 having perforations 79 in the meeting edges through which the lines pass from the passages 10 to the roll 38, and also a door 80 on one side of the reservoir 5 is hinged at 81 to give access to the sump.

The line is drawn from a suitable supply, as from a reel, upward through the first head 11ª up over the overhead roll 38, then passes downward over the wheels or pulleys 40, 41 up through the second head 11 of the series through the first passage 10, then up over the roll 38, and then in like manner through successive heads 11 and passages 10, and wound up in finished form. As the rolls 1, 2 rotate, they pick up the liquid coating from the sump and carry it to the passages 10, where the line is being revolved orbitally by the heads 11, while being drawn through the passages 10 by the roll 38.

The scrapers 22, 23 cause a predetermined amount of liquid coating to be supplied continuously and uniformly to the passages 10.

What I claim is:

1. In a machine for applying coatings to lines, the combination with a pair of rotating members arranged with their peripheries approximately tangent, the peripheries being formed to provide a tubular liquid-coating-receiving passage between them where said members run tangent, means for rotating said members, means for drawing the line through the passage, means by which a liquid coating is supplied to said passage by the rotation of said members, and means for moving the line orbitally in said passage.

2. In a machine for applying coatings to lines, the combination with a pair of rotating members arranged with their peripheries approximately tangent, the peripheries being formed to provide a tubular liquid-coating-receiving passage between them where said members run tangent, means for rotating said members, means for drawing the line through the passage, means by which a liquid coating is supplied to said passage by the rotation of said members, and means for moving the line orbitally in said passage, the last means comprising a rotating head alined with the passage and having a lengthwise passage through which the line is drawn, including an eccentric portion on the end thereof toward said passage.

3. In a machine for applying coatings to lines, the combination with a pair of rotating members arranged with their peripheries approximately tangent, the peripheries being formed to provide a liquid-receiving tubular passage between them where said members run tangent, means for rotating said members, means for drawing the line through the passage, a sump for the coating liquid arranged below the rotating members and into which the rotating members dip, and means for moving the line orbitally in said passage to cause the same to wipe the coating from the walls of the passage onto said line.

4. In a machine for applying coatings to lines, the combination of a pair of parallel rolls arranged with their peripheries running approximately tangent to each other, the rolls being formed to provide a tangential tubular passage between them where they run tangent to each other, a sump for the coating liquid below the rolls and into which the rolls dip, said passage being located above the sump, means for drawing the line through the passage, means for moving the line orbitally in said passage to cause the same to wipe the coating from the walls of the passage onto said line, and a guide for the line to said passage extending through the sump whereby the line is out of contact with the liquid coating in the sump.

5. In a machine for applying coating to lines, the combination of a pair of parallel rolls arranged with their peripheries running approximately tangent to each other, the rolls being formed to provide a tangential tubular passage between them where they run tangent to each other, a sump for the coating liquid located below the rolls and into which the rolls dip, said passage being located above the sump, means for drawing the line through the passage, a guide for the line to said passage extending through the sump whereby the line is out of contact with the liquid coating, said guide being a rotatable head extending through the sump and having a lengthwise passage therethrough including an eccentric portion on the upper end thereof through which the line passes.

6. In a machine for applying coatings to lines, the combination of a pair of parallel rolls arranged with their peripheries approximately tangent to each other and formed with peripheral grooves, the groove of one roll mating with that of the other roll where the rolls run tangent, forming a passage, means for drawing the line through said passage, means for supplying a settable liquid coating to the grooves, and means for moving the line orbitally while passing through said passage.

7. In a machine for applying coatings to lines, the combination of a pair of parallel rolls arranged with their peripheries approximately tangent to each other and formed with peripheral grooves, the groove of one roll mating with that of the other roll, where the rolls run tangent, forming a passage, means for drawing the line through said passage, means for supplying a settable liquid coating to the groove, and means for moving the line orbitally while passing through said passage, the last means comprising a rotating head alined with said passage and also having a passage through which the line passes located eccentric to its axis of rotation, and means for actuating the rolls and said head, 8. In a machine for applying liquid coatings to lines, the combination of a sump for the liquid coating, a pair of rolls arranged with their peripheries running tangent to each other formed with peripheral grooves, the groove of one roll mating with that of the other roll where the rolls run tangent forming a passage, the rolls dipping at their lower portions into the sump, means for drawing the line through said passage, and means for moving the line orbitally while passing through said passage, and means for actuating the rolls and the orbital means.

9. In a machine for applying liquid coatings to lines, the combination of a sump for the liquid coating, a pair of rolls arranged with their peripheries running tangent to each other formed with peripheral grooves, the groove of one roll mating with that of the other roll where the rolls run tangent forming a passage, the rolls dipping at their lower portions into the sump, means for drawing the line through said passage, and means for moving the line orbitally while passing through said passage, the means for moving the line orbitally comprising a rotating head extending through the sump above the level of the coating therein, and arranged with its axis in line with said passage, the head being provided with a lengthwise passage through which the line passes, the latter passage having an eccentric portion at the end thereof toward said passage between the rolls, and means for actuating the rolls, the head and moving the line lineally.

10. In a machine for applying coatings to lines, the combination of a sump for the liquid coating, a pair of rolls arranged with their peripheries running approximately tangent to each other and formed with peripheral grooves, the groove of one roll mating with that of the other where the rolls are tangent forming a passage, means for drawing the line through said passage, the lower portions of the rolls dipping into the sump, and a pair of scrapers for each roll, one scraper extending into the groove of the roll below the level of the liquid in the sump and substantially fitting the groove, and the other scraper being located out of the liquid coating and arranged to partly fit the groove to remove from the groove all of the liquid picked up from the sump, except a predetermined amount, the latter scraper being located between the first scraper and the passage with respect to the rotation of the roll, and means for actuating the rolls.

11. In a machine for applying coatings to lines, the combination of a sump for the liquid coating, a pair of rolls arranged with their peripheries running approximately tangent to each other and formed with peripheral grooves, the groove of one roll mating with that of the other where the rolls run tangent forming a passage, means for drawing the line through said passage, the lower portions of the rolls dipping into the sump, and a pair of scrapers for each roll, one scraper extending into the groove of the roll below the level of the liquid in the sump and substantially fitting the groove, and the other scraper being located out of the liquid coating and arranged to partly fit the groove to remove from the groove all of the liquid picked up from the sump, except a predetermined amount, the latter scraper being located between the first scraper and the passage with respect to the rotation of the roll, and means for moving the line orbitally in said passage during the lineal movement of the line, and means for actuating the roll and said orbital means.

12. In a machine for applying coatings to lines, the combination of a sump for the liquid coating, a pair of rolls arranged with their peripheries running approximately tangent to each other and formed with peripheral grooves, the groove of one roll mating with that of the other where the rolls are tangent forming a passage, means for drawing a line through said passage, the lower portions of the rolls dipping into the sump, and a pair of scrapers for each roll, one scraper extending into the groove of the roll below the level of the liquid in the sump and substantially fitting the groove, and the other scraper being located out of the liquid coating and arranged to partly fit the groove to remove from the groove all of the liquid picked up from the sump, except a predetermined amount, the latter scraper being located between the first scraper and the passage with respect to the rotation of the roll, a rotating head extending through the bottom of the sump and terminating above the level of the liquid therein, the head having its axis substantially alined with said passage and being formed with a lengthwise passage for the line, the portion nearest the passage being eccentric to the axis of the head, and means for rotating the rolls and said head.

13. In a machine for applying coatings to lines, the combination of a suitable receptacle, the lower portion of the receptacle serving as a sump for the liquid coating, coacting rolls journalled in the receptacle with their peripheries running tangent, the rolls dipping into the sump, each roll being formed with a series of peripheral circumferential grooves, each groove of one roll mating with a companion groove of the other roll where the rolls run tangent the peripheral grooves of one roll and the companion grooves of the other roll mate therewith forming a plurality of passages, means for passing the line through said passages successively, rotating heads extending through the bottom of the receptacle and terminating above the level of the liquid coating therein, the heads being arranged with their axes alined respectively with said passages, and each head being formed with a lengthwise passage and having an eccentric portion at its upper end through which the line passes in its movement through the passage between the rolls, and means for rotating the rolls and said head.

LOUIS J. MADDEN.